(12) United States Patent
Knoll

(10) Patent No.: US 8,928,965 B2
(45) Date of Patent: Jan. 6, 2015

(54) ELECTROCHEMICAL PROCESSOR, USES THEREOF AND METHOD OF COMPOSING THE ELECTROCHEMICAL PROCESSOR

(71) Applicant: Westfaelische Wilhelms-Universitaet Muenster, Muenster (DE)

(72) Inventor: Meinhard Knoll, Steinfurt (DE)

(73) Assignee: Westfaelische Wilhelms-Universitaet Muenster, Muenster (DE)

( * ) Notice: Subject to any disclaimer, the term of this patent is extended or adjusted under 35 U.S.C. 154(b) by 170 days.

(21) Appl. No.: 13/651,769

(22) Filed: Oct. 15, 2012

(65) Prior Publication Data

US 2013/0037409 A1 Feb. 14, 2013

Related U.S. Application Data

(63) Continuation of application No. PCT/EP2011/001714, filed on Apr. 6, 2011.

(30) Foreign Application Priority Data

Apr. 16, 2010 (EP) .................................... 10004088

(51) Int. Cl.
  *G02F 1/03* (2006.01)
  *G02F 1/153* (2006.01)
  *G02F 1/155* (2006.01)
  *G01K 3/04* (2006.01)

(52) U.S. Cl.
  CPC *G02F 1/155* (2013.01); *G01K 3/04* (2013.01); *G02F 2001/1536* (2013.01); *G02F 2001/1557* (2013.01)
  USPC ............ 359/245; 359/269; 359/270; 359/271

(58) Field of Classification Search
  USPC ......................................... 359/265–275, 245
  See application file for complete search history.

(56) References Cited

U.S. PATENT DOCUMENTS

| 5,930,023 A | 7/1999 | Mitchell, Jr. et al. |
| 8,830,554 B2 * | 9/2014 | Knoll ............................ 359/245 |

FOREIGN PATENT DOCUMENTS

WO 2009056591 A1 5/2009

OTHER PUBLICATIONS

International Search Report and Written Opinion issued in connection with the corresponding PCT Application No. PCT/EP2011/001714.
Chinese Office Action issued on Sep. 22, 2014 in connection with corresponding Chinese Application No. 201180022355.5 and English translation of same.

* cited by examiner

*Primary Examiner* — Jack Dinh
(74) *Attorney, Agent, or Firm* — Gesmer Updegrove LLP

(57) ABSTRACT

The present invention is related to an electrochemical processor, which comprises two electrodes of different electrochemical potential, which are bridged via an electrolyte. Upon, completion of the electric circuit between the two electrodes, the second electrode is oxidized and therefore changed in at least one physical parameter, e.g. the second electrode becomes transparent. The electrochemical processor is characterized in that the surface of the second electrode, which is in contact with the electrolyte, is partially covered with an electrically insulating material, wherein this material is adjacent to the electrolyte. Moreover, the present invention relates to the use of this electrochemical processor and a method of composing such electrochemical processor.

16 Claims, 12 Drawing Sheets

ELECTROCHEMICAL PROCESSOR, USES THEREOF AND METHOD OF COMPOSING THE ELECTROCHEMICAL PROCESSOR

PRIORITY INFORMATION

The present invention is a continuation of International Application No. PCT/EP2011/001714, filed on Apr. 6, 2011 that claims priority to EP Application No. 10004088.0 filed on Apr. 16, 2010, which are incorporated herein by reference in their entireties.

BACKGROUND OF THE INVENTION

The present invention is related to an electrochemical processor, which comprises two electrodes of different electrochemical potential, which are bridged via an electrolyte. Upon, completion of the electric circuit between the two electrodes, the second electrode is oxidized and therefore changed in at least one physical parameter, e.g. the second electrode becomes transparent. The electrochemical processor is characterized in that the surface of the second electrode, which is in contact with the electrolyte, is partially covered with an electrically insulating material, wherein this material is adjacent to the electrolyte. Moreover, the present invention relates to the use of this electrochemical processor and a method of composing such electrochemical processor.

The U.S. Pat. No. 5,930,023 describes an electrochemical display that comprises first and second electrode layers having different electrode potentials, an electrolyte layer overlapping said first electrode layer and forming a boundary with that first electrode layer and forming a boundary with that second electrode layer for completing an ionically conductive pathway between said first and second electrode layers, and said electrode boundary being movable together with the boundary of said second electrolyte layer extending the ionically conductive pathway from said first electrode layer in response to a flow of current between said first and second electrode layer for changing a visible appearance of the display. According to the special embodiments of the electrochemical display of the U.S. Pat. No. 5,930,023 both electrode layers are applied on a substrate and separated by a gap. An electrolyte layer, which is filed into this separating gap between the two electrodes and which partially overlaps the free surfaces of those electrodes is present for an electrical interconnection of said electrodes. However, most of the surface of the electrode layer, which is to be oxidized upon completion of the circuit pathway is exposed to a cavity inside that electrochemical display. Because of the fact that the electrolyte layer is an ionic conductor and present in the form of a paste or a gel or comparable liquid forms, the electrolyte layer is not totally rigid or solid, but exhibits certain viscoelastic properties and therefore can be distributed within the cavity, e.g. can be spread in an uncontrolled manner also on the surface of the electrode, which is exposed to said cavity. This uncontrolled distribution of the electrolyte can be affected by a plurality of factors, even by gravitation, if the electrochemical display according to the U.S. Pat. No. 5,930, 023 is arranged in a way that the electrolyte can run into said cavity. However, this leads to a major drawback of this electrochemical display in a way that the reaction time of this display is dependent on how this display is arranged spatially. Also, the reaction time of this chemical display cannot be guaranteed to be constant e.g. upon mechanical impact. Therefore, a calibration of this system is hardly possible, which makes this electrochemical display rather unreliable.

SUMMARY OF THE INVENTION

It is therefore an object of the present invention to provide an electrochemical processor, e.g. in form an electrochemical display, which is able to provide constant reaction times, therefore making available a far more reliable processor or display as described in U.S. Pat. No. 5,930,023. Furthermore, it is an object of the present invention to describe uses of the electrochemical processor according to the invention. A yet further object of present invention is to provide a method of assembling an electrochemical processor according to the invention.

These objects are solved by the features of claim 1 as far as the electrochemical processor is concerned, regarding the uses of said electrochemical processor by the features of claim 16 and as far as the method of assembly of said electrochemical processor is concerned by the features of claim 17. The dependent claims refer to advantageous features of the invention.

According to present invention, an electrochemical processor is provided, comprising a) a first electrode and a second electrode each having first and oppositely arranged second surfaces, wherein the first electrode and the second electrode have different electrode potentials and are physically separated from each other in x-direction, b) an electrolyte which covers at least a part of a first surface of the first electrode and a part of the first surface of the second electrode in y-direction and electrically interconnects said first electrode with the second electrode, wherein at least a part of the first surface of the second electrode which is uncovered by the electrolyte is covered with an electrically insulating material in y-direction which borders the electrolyte and wherein the activation of the electrochemical processor enables a lateral delamination of the second electrode and the insulating material beginning at the contacting area of the second electrode and the insulating material, which provides a channel between the second electrode and the insulating material.

According to this principle embodiment of present invention, two electrodes are present, wherein the second electrode is selected to have a lower electrochemical potential compared to the first electrode, i.e. these two electrodes can be referred to as a local element, wherein upon completion of an electric circuit between the first and the second electrode, a corrosion of the second electrode takes place. These two electrodes are not in direct physical contact with each other, i.e. separated by a gap from each other. The electrical connection between these two electrodes is accomplished by an electrolyte, which is applied onto first surface of those electrodes. It is also possible that the electrolyte can be present inside the gap in-between the two electrodes. The central idea of present invention is to apply an electrically insulating material onto the same surface of the second electrode, onto which the electrolyte is present. This insulating material can be a coating or a composite coating applied to the first surface of the second electrode. By this electrically insulating material, the area of the first surface of the second electrode, which can be contacted with the electrolyte is limited to the area which is uncovered by the electrically insulating material. According to this feature, the possibility that the electrolyte spreads in an uncontrolled manner over the complete first surface of the second electrode is excluded. Therefore, upon completion of the electrical circuit between the two electrodes, a controlled corrosion of the second electrode is possible. Due to the fact that the second electrode is laminated with an insulating material, upon activation of the processor e.g. an oxidation of the second electrode and therefore, a controlled lateral delamination of the insulating material from the second electrode occurs. The second electrode will be corroded where it contacts the electrolyte at first, the corrosion will then proceed laterally in direction of the insulating material. The corrosion begins spatially where the second electrode is contacted with the electrolyte. This leads to a channel or gap in-between the second electrode and the insulating material, into which the electrolyte infiltrates and advances with progression of corrosion of the electrode. This controlled corrosion however leads to predictable and adjustable reaction times of the electrochemical processor, i.e. the time that is needed to corrode the second electrode to a predefined extent. The insulating material, which is present on the first surface of the second electrode therefore makes the complete arrangement of the electrochemical processor very reliable and leads to repeatable reaction times of the electrochemical processor. The activation of the processor can be achieved by electrically externally (i.e. establishing an electrical contact outside of the processor) contacting the first and the second electrode.

The invention relates to an electrochemical processor in which chemical and/or electrochemical processes can be carried out. These processes can be started in an electrical way at any time. The processor comprises e.g. optical display elements. It receives its electric energy from its layer composition and does not require any electric battery. Microscopic as well as macroscopic systems can be implemented the functions of which are based on the electrochemical generation of nanometric interface layers.

The electrochemical processor can be realized as a layer system and can be used, e.g. for the following purposes:
  micro reaction engineering
  time indicators
  temperature-time integrators.

According to a preferred embodiment of present invention, a third electrode having a first and an oppositely arranged second surface is aligned next to the second electrode and is physically separated from the second electrode and aligned in x-direction opposite to the first electrode. This device can be activated, if the first electrode is electrically externally contacted with the third (or the second) electrode.

This further electrode, which is present in addition to the first and second electrodes, is electrically connectable to the second electrode. This can be achieved by the presence of e.g. a migration layer, which is in direct physical contact with parts of the first surface of the second electrode and at least a part of the third electrode. As far as the migration layer is concerned, reference is made to the WO 2009/056591 A1, which describes the migration layers, the compounds used for the migration layer as well as methods for manufacturing said migration layer on e.g. an electrode, in detail. The complete content of disclosure of the WO 2009/056591 A1, as far as the migration layer is concerned is incorporated into present application by reference. In particular, the same materials as described by the WO 2009/056591 A1 can be used for the migration layer.

Furthermore, it is preferred if the electrochemical processor comprises a substrate onto which the first electrode, the second electrode and if present the third electrode are arranged with their respective second surface. According to this special embodiment, the electrodes are fixed on the substrate directly. It is also possible that further layers lying in-between the substrate and the respective electrodes can be present, e.g. between the substrate and e.g. the second electrode, which can act as indicating layers, such as a graphics layer or an image. These layers can also be present on the "lower" side of the substrate, i.e. the opposite side of the substrate onto which the electrodes are applied. It is therefore preferable, if the substrate is transparent. Thus, the electrochemical processor is built in stacked type, wherein the electrodes are applied on a substrate and thereupon the electrolyte e.g. as layer is applied. The lateral dimension of such an arrangement can be referred to as the x-direction, wherein the stacking direction of these separate layers, e.g. substrate, electrodes and electrolyte, etc., can be referred to as y-direction.

Furthermore, it is preferred that an encapsulation layer, which is parallel arranged to the substrate is comprised, wherein the first electrode, the second electrode, if present the third electrode, the electrolyte as well as the insulating material are sandwiched between the substrate and the encapsulation layer in y-direction. Preferably, this encapsulation layer finishes the processor spacially, i.e. borders the processor.

This special embodiment is an extension of the aforementioned embodiment according to which the electrodes are applied on a substrate. The encapsulation there lies on top of this aforementioned arrangement, i.e. borders, e.g. the electrolyte as well as the insulating material, which lies adjacent to the electrolyte.

Furthermore, it is possible that two oppositely arranged spacers are comprised, which delimit the electrochemical processor in x-direction, wherein one spacer and the isolating material form walls of a first reaction chamber which contains the electrolyte.

These spacers or spacing elements can be made of the same material like the substrate and/or the encapsulation layer. Furthermore, these spacers define the spatial distance between e.g. the substrate and the encapsulation layer and therefore define the complete thickness of the electrochemical processor in y-direction together with substrate and encapsulation layer. Furthermore, the spacing element being adjacent to the electrolyte serves as a wall in x-direction of a first reaction chamber, which can contain the first electrolyte. The opposite wall in x-direction is formed by the boundary of the encapsulation material, which is applied on a part of the surface of the second electrode. The other boundaries or walls of this reaction chamber are e.g. formed by the first surface of the first electrode and the encapsulation layer (both are the walls in y-direction). For completion of the reaction chamber, the chamber of course is also walled in z-direction by respective walls which e.g. can be built of the same material as the substrate or the encapsulation layer.

However, it is also possible that one of these walls forming the first or second reaction chamber comprises an opening, which allows a communication of the first and/or the second reaction chamber, respectively, with the environment surrounding the electrochemical processor. This opening or window can be used for a mass exchange between the environment and the inner of the respective reaction chamber. For example, this window can be used to introduce moisture of the surrounding environment into the reaction chamber, so that this moisture can be absorbed by the electrolyte. This embodiment is especially advantageous, if dry electrolytes are applied inside the reaction chamber, which become conductive upon absorption of water. Therefore, a processor can be provided, which can be activated in-situ, i.e. the processor is assembled with a dry electrolyte, i.e. dry polyvinyl alcohol, which becomes not conductive until the electrochemical processor is brought into the environment, in which the electrochemical processor is intended to be used.

According to a further embodiment, the second spacer in y-direction is aligned in a way that it borders the insulating material, which is applied on the first surface of the second electrode on the opposite side of the afore-mentioned reaction chamber. This means that the second spacer directly adjoins or borders the insulating material and delimits the electrochemical processor on the opposite side as the first spacer in x-direction.

In an alternative embodiment, this second spacer is separated from the insulating material, i.e. a certain cavity between the insulating material and the second spacer (in x-direction) is present. This means that the insulating material and the second spacer form walls in x-direction for a second cavity, i.e. a second reaction chamber. The other walls of this second reaction chambers are comparable to the walls of the afore-mentioned first reaction chamber, i.e. in y-direction, these walls are e.g. the substrate and encapsulation layer, whereas in z-direction, respective elements are present which close the second reaction chamber.

According to a further advantageous embodiment of present invention, the second reaction chamber is filled at least partially with a second electrolyte being the same as the first electrolyte or different from the first electrolyte. Furthermore, the second reaction chamber can be filled with a reactant.

Reactants can be substances that inter-act physically or chemically with the first electrolyte being present e.g. in the first reaction chamber.

According to a further preferred embodiment, a swelling layer and/or at least one swelling element is arranged between the second electrode and the insulating material. This swelling layer can be present in-between the total area in which the isolating material covers the first surface of the second electrode. Alternatively, it is also possible that this layer only is present in a certain region of the second electrode. Instead of a layer, also punctual or two-dimensional swelling elements can be present. The materials of these swelling layers or swelling elements are designed in a way that their volume, upon contact with an electrolyte, such as comprised in the first reaction chamber, will increase.

According to a further preferred embodiment of present invention, a migration layer is comprised, which is aligned on a part of the first surface of the second electrode and at least a part of the first surface of the third electrode. As far as this migration layer is concerned, e.g. the materials of this migration layer or the dimensions, etc., explicit reference is made to the WO 2009/056591 A1, the content of which is incorporated herein by reference.

This migration layer comprises materials or is composed of materials which are able of ionic conduction. Due to the fact that this migration layer contacts both second and third electrode, therefore, an electrical conductive pathway can be established between the second and third electrode, if ions are present in the migration layer.

According to yet a further preferred embodiment of present invention, the first surface of either the second electrode and/or if present the third electrode is at least partially covered with a covering layer or covering elements are embedded in the first surface of said electrodes.

Furthermore, also the possibility is encompassed that a migration electrode or a reactive subsystem is comprised, which is physically connected with the second electrode.

Furthermore, it is advantageous if the first electrode, the second electrode and/or the third electrode is designed as layer with a preferred layer thickness between 10 and 100.000 nm, preferably between 20 and 1.000 nm, especially between 30 and 500 nm.

In another advantageous embodiment, an external conductive pathway is present, over which the first electrode is connectable to either the second electrode, the third electrode, the migration electrode or the subsystem, respectively. This external conductive pathway furthermore comprises a switch for completion of the electric circuit, upon which the chemical reaction inside the electrochemical processor is initialized, e.g. the corrosion of the second electrode begins.

Preferred materials for each of the components of the processor are given in the following: The first electrode and/or the third electrode comprises a material or is composed of a material selected from the group consisting of graphite carbon black, a two component material comprising graphite and an (meth)acrylic resin; electrically conductive polymers, preferably poly(3,4-ethylenedioxy)thiophene (PEDOT), poly(3,4-ethylenedioxythiophene)-poly(styrenesulfonate) (PEDOT:PSS), polyaniline, doped polyaniline (PANI); and/or metals.

The second electrode comprises a material or is composed of a material selected from the group consisting of metals, such as aluminium, tantalum or electrically conductive polymers, preferably poly(3,4-ethylenedioxy)thiophene (PEDOT), poly(3,4-ethylenedioxythiophene)-poly(styrenesulfonate) (PEDOT:PSS), polyaniline, doped polyaniline (PANI).

The first electrolyte and/or the second electrolyte comprises inorganic salts, preferably NaCl, $CaCl_2$, $LiClO_4$; and/or acids, preferably weak acids, wherein the first electrolyte is preferably a solution or a gel of said inorganic salts and/or said acids, wherein the solution or gel can contain additives, such as alkylene glycols, e.g. ethylene glycol, or mixtures of water-ethylene glycol, and/or thickeners, such as polyvinyl alcohols and/or polysaccharides, such as cellulose and/or starch, water-free electrolytes on the basis of N,N-dimethylformamid, N,N-dimethylacetamid and/or γ-butyrolacton. Thickeners allow a printing of the electrolyte. The thickening of the electrolyte enables applying the electrolyte via printing techniques, e.g. screen printing methods, etc. In cases where non-aqueous electrolytes are used, the moisture of the surrounding environment can be used to wetten the electrolyte to become conductive.

The electrically insulating material and/or the spacers comprise a material or is composed of a material selected from the group consisting of a polyester, polyethylene, polyropylene and/or a lacquer of a resin, preferably a (meth)acrylic resin, a copolymeric resin comprising a (meth)acrylate and/or a polyurethane. Preferably, the insulating material is transparent.

The substrate comprises a material or is composed of a material selected from the group consisting of a plastic material, preferably polyethylene, polypropylene, coextruded polyethylene, coextruded polypropylene, polyethylene terephthalate, polyethylene naphthalene dicarboxylate, polycarbonate and/or polyamide; paper, coated paper, glass or a ceramic material.

The encapsulation layer comprises a material or is composed of a material selected from the group consisting of a plastic material, preferably a polyethylene, polyester, a laquer on basis of a (meth)acrylate resin, (meth)acrylatecopolymers and/or polyurethanes, wherein said material preferably is transparent.

The swelling layer and/or the at least one swelling element comprises a material or is composed of a material selected from the group consisting of materials that increase its volume upon contact with water or the electrolyte, preferably polyvinyl alcohol.

The migration layer comprises a material or is composed of a material selected from the group consisting of materials that increase its volume upon contact with water or the electrolyte, preferably polyvinyl alcohol.

The covering layer and/or the at least one covering element comprises a material or is composed of a material selected from the group consisting of graphite carbon black, aluminium or electrically conductive polymers, preferably poly (3,4-ethylenedioxy)thiophene (PEDOT), poly(3,4-ethylene-dioxythiophene)-poly(styrenesulfonate) (PEDOT:PSS), polyaniline, doped polyaniline (PANI).

The migration electrode comprises a composite material comprising at least one electrically conductive polymer in combination with a ion conductive polymer, preferably a composite of polyaniline and polyvinyl alcohol, a composite of PEDOT:PSS and polyvinyl alcohol and/or combinations thereof.

The subsystem is composed of substances which show a physical change of at least one material property or undergo a chemical reaction upon contact with an electrolyte and/or an aqueous solution, preferably a colour indicator, a substance or composition producing an exothemic reaction, a substance or composition producing an increase in its volume.

According to a special embodiment, the electrochemical processor can be built as indicator, such as a time indicator or a time-temperature-integrator. According to this embodiment, it is preferable if a graphics layer comprising at least one image and/or a coloured signal is aligned on at least a part of the second surface of the second electrode and/or the surface of the substrate opposite to the surface into which the electrodes are aligned. In the later case, it is preferred, if the substrate, the insulating material and the oxidized electrode are transparent.

Furthermore, uses of the electrochemical processor as described above are provided. Special uses, among others, are use of the electrochemical processor as time indicator, time-temperature-integrator, part of package for food, sauces and/or beverages, drugs, pharmaceuticals, cosmetics and/or chemicals, such as containers, bottles, tetra pack cartons, or lids or screw caps for said containers. In a preferred embodiment, an external switch, which is present at the aforementioned containers is actuated and the circuit of the processor is closed when said containers are first opened. This switch can be e.g. a membrane switch or a sheet switch.

Furthermore, present invention provides a method of composing, assembling or manufacturing an afore-mentioned electrochemical processor, wherein
a) a first electrode and a second electrode each having first and oppositely arranged second surfaces, wherein the first electrode and the second electrode have different electrode potentials and are separately aligned from each other in x-direction,
b) at least a part of a first surface of the first electrode and a part of the first surface of the second electrode is covered with an electrolyte in y-direction, wherein the electrolyte interconnects said first electrode with the second electrode, and
c) at least a part of the first surface of the second electrode which is uncovered by the electrolyte is covered with an electrically insulating material in y-direction which borders the electrolyte.

In an advantageous embodiment of the method according to present invention, a substrate is provided onto which the two electrodes are applied with their second surface.

Furthermore, the substrate can be supplied with an indicating layer, which can be an indicating layer or an image etc. This indicating layer can be applied on the same surface of the substrate, onto which the electrodes are applied; in this case, the indicating layer is applied before the electrodes are fixed on the substrate. In an alternative embodiment, the indicating layer can also be applied to the outside surface of the substrate, i.e. the opposite surface of the substrate onto which the electrodes are applied. When the second electrode, e.g. an aluminium electrode, becomes oxidized, it becomes transparent and the underneath lying image becomes visible.

In the case that the electrodes are metal electrodes, these electrodes can be applied by metallization techniques, i.e. by evaporation of metals onto said substrate, e.g. evaporation of aluminium. Furthermore, sputtering techniques can also be used to apply the metal-electrodes onto the substrate. The starting point for manufacturing said processor can also be a half-finished product, such as a plastic film, i.e. a polyester-film, which is vaporized with e.g. aluminium. Such semi-finished products are known as packaging materials.

Furthermore, the vaporized electrode-layer can be structurized by laser ablation.

All further layers, compounds such as the covering layer, are spacing elements, the insulating material or the indication layers can be applied by mechanical methods such as printing methods, above all. Screen printing methods and/or flexo-print methods or by the use of dosing robots.

An advantageous example of producing a processor according to present invention is given in the following:

A first electrode shall be made of graphite. This graphite layer is deposited on an Al-vaporized sheet. After deposition of the electrolyte, the Al-layer, lying beneath the graphite layer and inbetween a graphite layer and the substrate is auto-oxidized to form $Al_2O_3$ and/or aluminium oxide hydroxide, which results in a stacked assembly, comprising a sheet (substrate), a layer of aluminium oxide or a aluminium oxide hydroxide, onto which graphite as first electrode is deposited.

DETAILED DESCRIPTION OF THE ILLUSTRATED EMBODIMENTS

The present invention will be described in greater detail in the following description together with the accompanying figures. However, these figures shall not be understood in a limiting sense to the general principle of present invention.

PREFERRED MATERIALS AND METHOD OF MANUFACTURING

Figure 1:
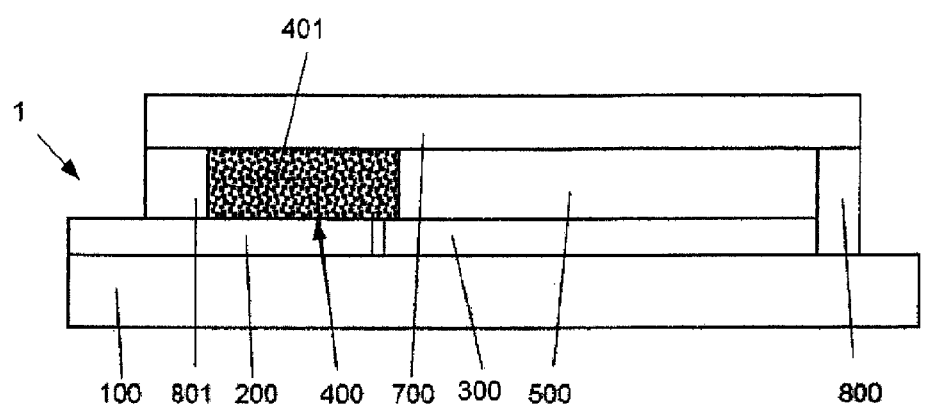
FIG. 1 shows a first embodiment of the electrochemical processor according to present invention.

The substrate consists, e.g. of polyethylene film, polyester film, polypropylene film (PP) or PPC film (polypropylene coextruded), polyimide film or of any other material which for the application aimed at has adequate mechanical, chemical and thermal stability as well as electric insulation properties. The film thickness can amount to some micrometers, however, some millimeters as well. A practically useful value is around, e.g., at 200 μm.

The electrodes consist e.g. of the following materials:
Graphite

The graphite layer can be produced, e.g., from the following material: acrylic resin and colloidal graphite in propanol, Graphit 33 of Kontaktchemie, CRC Industries Deutschland GmbH, Südring 9 DE-76473 Iffezheim.

Electrically conducting "PEDOT" (3,4-polyethylenedioxythiophene)

The Bayer Company offers this polymer doped with polystyrene sulfonic acid which is added during the polymerization, as a suspension in water under the name Baytron P. This material is named PEDOT:PSS.

[http://www.hcstarck.de/index.php?page_id=292&prod_service_id=310&anw_id=97&showlogin=no&suchstart=call: 5 Jan. 2010].

Electrically conducting polyanilin

This is available, e.g. from Panipol Company (Finland) as PANIPOL T (polyanilin in toluene) [http://www.panipol.fi/ call: 5 Jan. 2010].

However, all other electrically conducting polymers can also be used.

The deposition of the electrode layers made of electrically conducting polymers or graphite can be carried out, e.g. by means of a dosing robot, screen printing, flexographic printing, spraying, roller application, rotary coating, ink jet printing, film spreading method with different doctor blades or by means of any other appropriate method. Typical layer thicknesses are between 50 nm and 500 μm.

Electrodes made of thin aluminium films can be implemented by vapour deposition of aluminium onto plastic films. As an industrial primary product, e.g. polyester film having a vapour deposited aluminium film and an aluminium film thickness of <1 μm from Nawrot Company can be used [http://www.nawrot.de/de/ueberblick.html.

Electrolyte Film

For example, aqueous solutions of NaCl, $CaCl_2$ or $LiClO_4$ in acetonitrile but also any other electrolyte can be used as electrolytes.

The electrolyte can be deposited as a gel-like layer. For this, e.g. an agarose gel can be used.

The deposition can be carried out, e.g. by means of a dosing robot, screen printing, flexographic printing, spraying, roller application, rotary coating, ink jet printing, film spreading method with different doctor blades or by means of any other appropriate method. Typical layer thicknesses are between some μm to 1 cm, preferably at some 10 μm to some 100 μm.

Encapsulation Layer

The encapsulation layer consists, e.g. of polyethylene, polyester, acrylic resin based lacquer, acrylate copolymer, urethane enamel. However, any other materials can also be used which have adequate adhesive and encapsulation properties.

The deposition of the encapsulation layer can be carried out, e.g. by means of a dosing robot, screen printing, flexographic printing, spraying, roller application, rotary coating, ink jet printing or by means of any other appropriate method. Typical layer thicknesses are between some μm to 1 cm, preferably at some 10 μm to some 100 μm.

It is possible to deposit the layer in the heat laminating method as well.

Electrically Insulating Material and Spacer Elements

These consist of, e.g. acrylic resin based lacquer, acrylate copolymer, urethane enamel. However, any other materials can also be used which have adequate adhesive properties.

The deposition of the electrically insulating material and/ or the spacers can be carried out, e.g. by means of a dosing robot, screen printing, flexographic printing or laminating methods. Typical layer thicknesses are between some μm to 1 mm, preferably at some 10 μm to some 100 μm.

It is possible to deposit these compounds as layers or as a film, for example made of polyester or polyethylene, e.g. by the heat laminating method.

Migration Layer

Varying migration layers and methods for manufacturing thereof have already been disclosed in the patent application PCT/EP2008/064712. As far as the possible compounds or materials for this layer are concerned, explicit reference is made to this patent application.

Example for Manufacturing a Migration Layer with Polyvinyl Alcohol PVAL:

0.2 g $CaCl_2.6H_2O$ is dissolved in 10 ml of deionized water and 0.6 g of polyvinyl alcohol (PVAL) is added to this electrolyte and which is stirred at 80° C. for about two hours. After cooling, 0.35 g isopropanol is added under stirring. The deposition can be carried out, e.g. by means of a dosing robot, screen printing, flexographic printing or any other printing method or film spreading method. Typical layer thicknesses are between some μm to 1 mm, preferably at some μm to some 100 μm.

After depositing the polyvinyl alcohol layer is dried.

Swelling Layer and Swelling Elements

These are able to consist, e.g. of polyvinyl alcohol or any other material which increases its volume during the absorption of water and an electrolyte, respectively. This deposition can be carried out, for example by means of a dosing robot, screen printing, flexographic printing, spraying, roller application, rotary coating or any other printing method. Typical layer thicknesses are between some μm to 1 mm, preferably at some μm to some 100 μm. After depositing the polyvinyl alcohol layer is dried.

Applications

The electrochemical processor is able to be employed, e.g. in the micro reaction engineering for such applications in which at a predetermined time a reactant is to be brought into contact with an electrolyte in order to set off a chemical and/or electrochemical reaction. Here, it concerns with a great and new field of application.

However, the invention can also be used as a time indicator or as a temperature-time integrator. These are allowed to be parts of product packages—particularly food packages. Time indicators can be started, e.g. when opening a package by establishing an electric short-circuit between the two layers of the electrochemical processor. Time indicators thus indicate the lapse of time after opening the package.

Also, temperature-time integrators can be started in this way. They can be used as an electronic best-before date. Such an application is known from the earlier patent application PCT/EP2008/064712. Having the electrochemical processor, it additionally results the possibility of electric activation of the system (e.g. with opening the package). Both inventions can be combined with each other into one product.

FIG. 1 shows a principle embodiment of the processor according to present invention. On a substrate 100 a first reaction chamber 400 having a first electrode 200 (starting electrode) is located. The first reaction chamber 400 is filled with an electrolyte 401. A second electrode 300 (delamination electrode) is in electric connection with the first reaction chamber 400. The second electrode 300 and the insulating material in form of an insulating composite coating 500 are fixed to each other. Where the second electrode 300 is in contact with the composite coating 500, electrolyte contact with the second electrode 300 is prevented. The electrochemical processor 1 is limited by spacers 800 and 801 in x-direction. These spacers 800, 801 interconnect the first electrode 200 or the substrate 100, respectively, with the encapsulation layer 700 and thus determine the thickness or size of the processor 1 in y-direction.

The first 200 and the second electrode 300 are located next to each other in x-direction and consist of different materials and forming an electrochemical cell in combination with an electrolyte 401. By establishing an electric short circuit between the first 200 and the second electrode 300 via e.g. an external switch, which is aligned outside the processor 1 (not shown) electrochemical processes can be set off on the electrodes, especially on the second electrode 300.

An electrochemical reaction on the second electrode 300 causes a separation of the material compound between the composite coating and the second electrode 300 thus forming a nanometric interlayer, which will be discussed in detail later on.

In FIG. 1, the first electrode 200, e.g. consists of graphite and the electrode 300 consists of a thin aluminium film having a thickness of some 10 nm. Upon activation of the processor 1, the electrolyte 401 migrates because of the separation of the material compound between the second electrode 300 and the composite coating 500 in the developing aluminium oxide film (not shown) and the interlayer to the composite coating 500 as explained in the following examples. Since the electrode 300 is laterally converted into aluminum oxide and/or aluminium oxide-hydroxide, this electrode can also be used as an optical display element.

The first reaction chamber 400 is bounded by the spacer 801 and the insulating composite material 500 in x-direction, as well as by the first electrode 200 and the encapsulation layer 700 in y-direction. Of course, the first reaction chamber 400 is also bounded by respective wall members in z-direction, however, these elements are not shown in the cross-section as shown in FIG. 1.

In another embodiment of the processor 1 according to present invention, the possibility is also given, that one of the wall members defining the first reaction chamber 400 (or also the second reaction chamber 600 as in the following examples) comprises an opening (not shown) which allows a mass exchange with the surrounding environment of the processor 1. This opening can e.g. be located in the encapsulation layer 700, the wall member 801, or the respective wall members in z-direction. In this case, the reaction chamber 400 is filled with a substance, which is able to absorb water vapor from the surrounding environment, e.g. polyvinyl alcohol, or polyvinyl alcohol with a hygroscopic additive, e.g. hygroscopic salts, such as e.g. calcium chloride. If this hygroscopic substance is in contact with water vapour via the above-mentioned opening, it absorbs water and an electrolyte 401 is formed inside the first reaction chamber 400. Of course, this principle can also be applied to the following examples as well as the second reaction chamber 600.

FIG. 2a shows a sectional view of a substrate 100 having a first electrode (starting electrode) 200, a second electrode (delamination electrode) 300, an electrolyte 401 in a first reaction chamber 400, a second reaction chamber 600, spacer elements 800, 801 as well as an cover layer 700. In FIG. 2b a top view is shown.

The electrolyte 401 in the first reaction chamber 400 is in contact with the first electrode 200 and parts of the second electrode 300 (the first surfaces of these electrodes).

The first electrode 200 consists, e.g. of PEDOT:PSS, and the second electrode 300 consists of a thin aluminium film. Both electrodes can be short-circuited externally, e.g., where they lie exposed on the left edge (FIGS. 2a and 2b). This results in an electrochemical oxidation of the thin aluminium film 300 in the short-circuited electrochemical cell 1 due to the different electrode potentials. Oxidation is starting where aluminium 300 is in contact with the electrolyte 401. Aluminium 300 is converted into aluminium oxide 900.

Then, on the left edge of the composite coating 500, the solid layer contact between the composite coating and the aluminium of the second electrode 300 becomes loose because the aluminium oxide 900 generated on electrochemical way develops a nanometric interlayer between the aluminium film 300 and the composite coating 500.

This process continues laterally below the composite coating 500, and the aluminium oxide 900 reaches the second reaction chamber 600. As shown in FIG. 2c, it is possible for the second electrode 300 on its surface to be converted into aluminium oxide 900. However, it is also possible in use of very thin aluminium films (e.g. some 10 nm) to oxidize the entire electrode layer up to the substrate 100 (FIG. 2d). Because of the laterally spreading aluminium oxide film 900, also a thin electrolyte film 401 migrates up to the second reaction chamber 600. If there is a reactant in the second reaction chamber 600, a chemical reaction due to the contact with the electrolyte 401 can take place.

Figure 2:
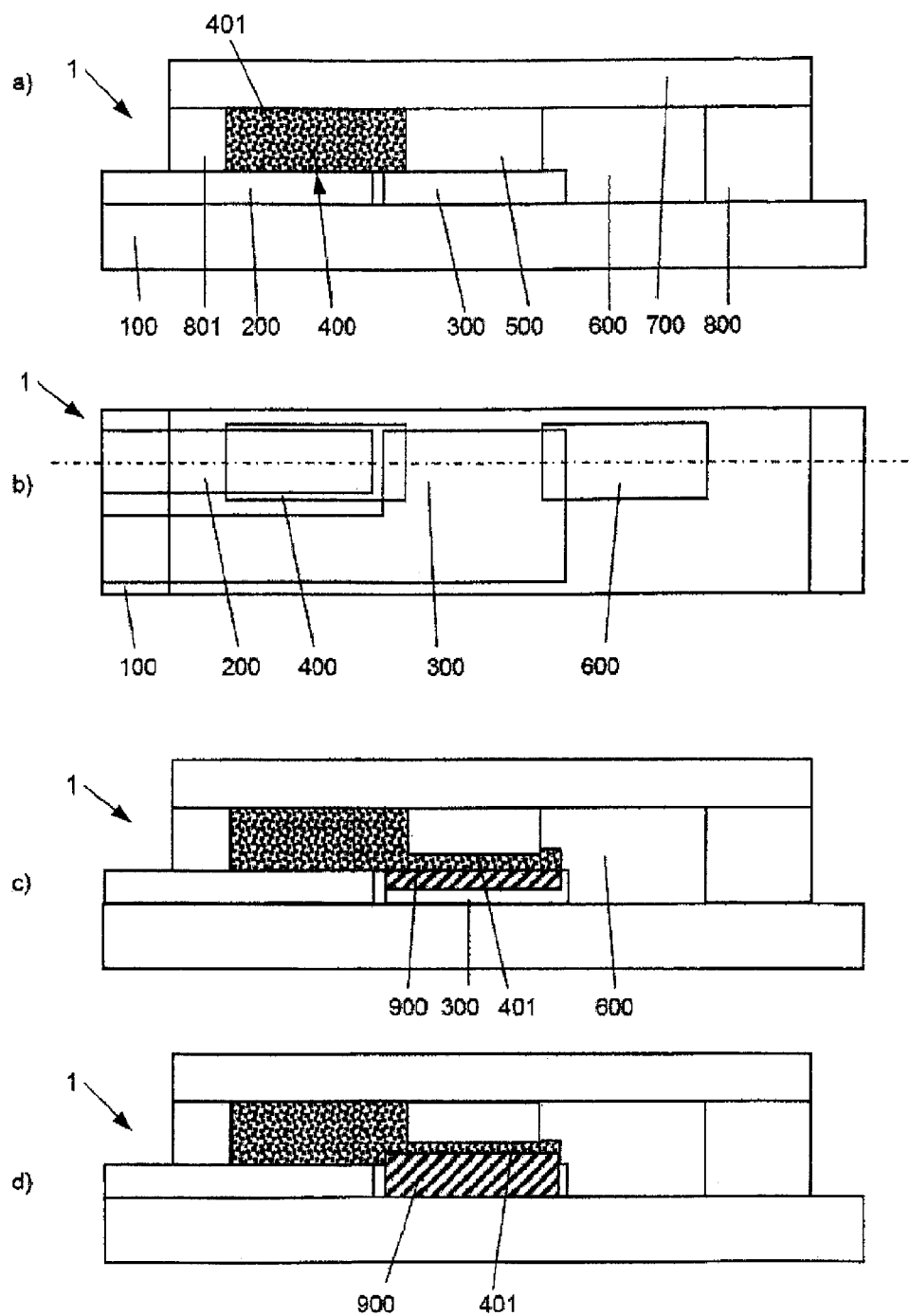
FIG. 2 shows different perspectives of a second embodiment of the electrochemical processor comprising two reaction chambers.
Figure 3:
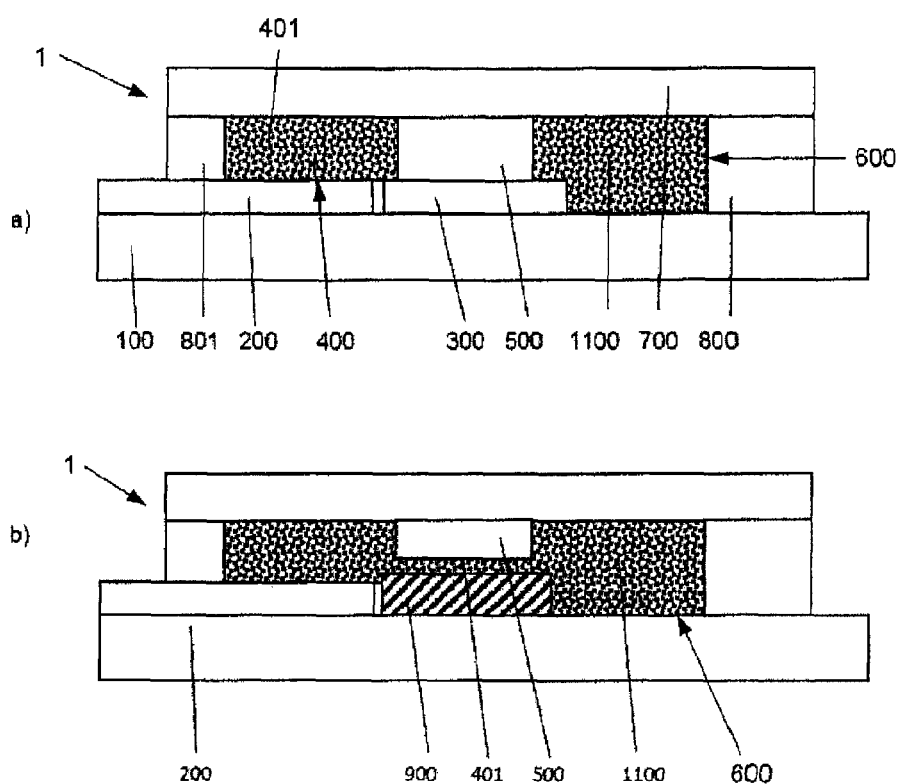
FIG. 3 shows yet another embodiment of the electrochemical processor comprising two reaction chambers both filled with an electrolyte and/or a reactant.

In FIG. 3, there is shown a system according to FIG. 2 in which a reactant 1100 takes up the space of the second reaction chamber 600. FIG. 3a shows the system before, FIG. 3b after the chemical oxidation of the second electrode 300.

Because of the aluminium oxide film 900 spreading laterally, also herein a thin electrolyte film 401 migrates from left to the right until a contact occurs with the reactant 1100 in the second reaction chamber 600. Because of the occurring contact of the material a chemical reaction can be set off. Such an application can be employed, e.g. in the micro reaction engineering.

Figure 4:
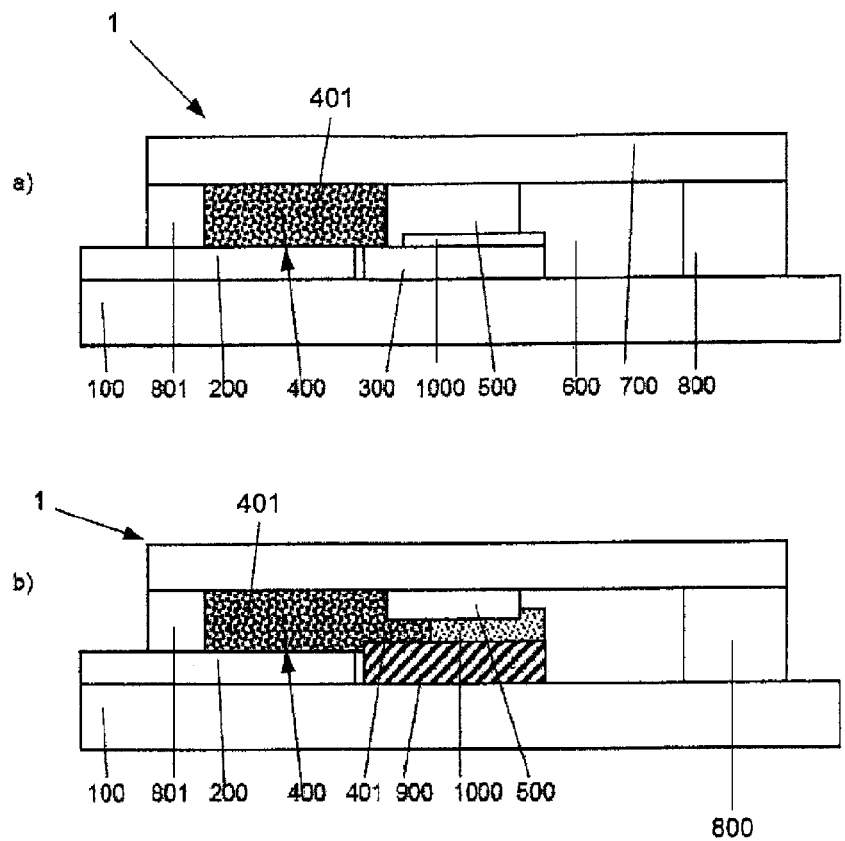
FIG. 4 shows an electrochemical processor with a swelling layer.

The film thickness of the electrolyte film 401 between the aluminium oxide film 900 and the composite coating 500 can be increased in that between the composite coating 500 and second electrode 300 a swelling layer 1000, e.g., made of polyvinyl alcohol (PVAL) is inserted (FIG. 4a). This swelling layer is able to assimilate the electrolyte and because of that to swell. As shown in the example according to FIG. 4b, here an aluminium oxide film also spreads laterally because of the separation of the material compound between the aluminium of the second electrode 300 and the compound layer 500. It drags an electrolyte film 401 behind. During contact between the electrolyte and swelling layer 1000 the latter is swelling in its thickness and forming a greater channel cross section for the electrolyte 401. (The film thickness ratios are not shown to scale in the figure. For the sake of simplification of the illustration herein the increase of the film thickness of the swelling layer 1000 is at the expense of the composite coating 500. This is not the case in fact, but the total film thickness of the system is changing).

Figure 5:
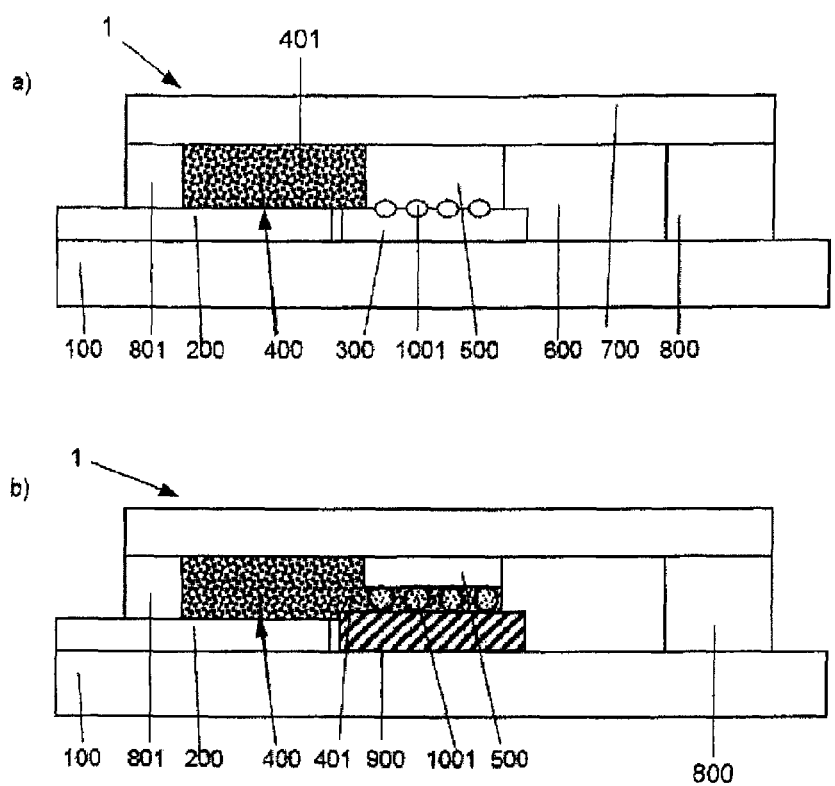
FIG. 5 shows an electrochemical processor according to present invention comprising swelling elements.

However, instead of the swelling layer 1000 swelling elements 1001 can also be used (FIG. 5). These swelling elements 1001 are arranged between the composite coating 500 and the second electrode 300. They may be formed in an island pattern or else as strips (in parallel or transversely to the migration direction of the electrolyte 401). For the sake of simplification, swelling layers and swelling elements are not shown in the following embodiments. They can similarly be used in the preceding or following examples.

Figure 6:
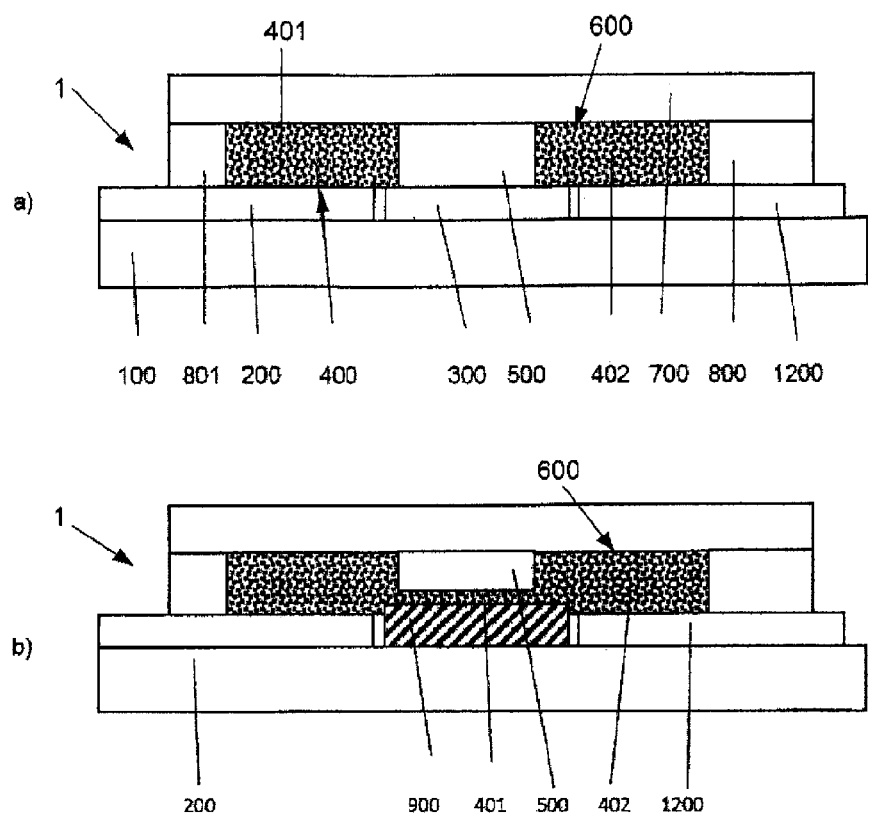
FIG. 6 shows an electrochemical processor according to present invention comprising two reaction chambers and three electrodes.

In FIG. 6a, a system is shown, which comprises a third electrode 1200, being aligned next to the second electrode 300. Here, an electrolyte 402 takes up the space of the second reaction chamber 600. Additionally, the third electrode 1200 contacts the electrolyte 402 in the second reaction chamber. When the material compound between the second electrode 300 and compound layer 500 is loosened as illustrated in the preceding examples also an electrolyte channel 401 (FIG. 6b) is formed. Because of that an electrochemical cell is formed with the third electrode 1200. After formation of the electrolyte channel 401, for example, an electrochemical reaction on the third electrode can be set off between the first electrode 200 and the third electrode 1200 when the first and the third electrodes are electrically connected. This third electrode can be made of an electrochromous material, for example, PEDOT:PSS, PANI.DBSA or another. When the first and the third electrodes consist of different materials and these being short-circuited then electrochemical effect is caused on the third electrode according to the potential difference between the first and third electrodes.

The third electrode 1200 may similarly consist of a thin aluminium film. When the third electrode 1200 is connected with the first electrode 200 (for example made of PEDOT:PSS) so electrochemical oxidation of the electrode 1200 arises after the development of the electrolyte channel 401 which electrode is converted that way into aluminium oxide and so will be transparent where the aluminium previously was in contact with the electrolyte. In this manner, the third electrode 1200 can be used as an optical display element.

In FIG. 7a an arrangement with a third electrode 1200 as well as an additional migration layer 1300 is shown. Migration layer systems are known from the patent application PCT/EP2008/064712. The whole inventive contents disclosed there is to be included with into the patent application prepared herein. In the present example the first electrode 200 consists of PEDOT:PSS, the second electrode 300 and the third electrode 1200 consist of a thin aluminium film having a film thickness of some 100 nm. The migration layer 1300, for example, consists of polyvinyl alcohol and is in contact with the second electrode 300 and the third electrode 1200. The second electrode 300 and the third electrode 1200 are electrically connected with the first electrode 200.

When the electrolyte channel 401 is created as shown in the preceding embodiments then the electrolyte 401 is in contact with the migration layer 1300 (FIG. 7b). The polyvinyl alcohol layer is able to absorb the electrolyte on this contact area. The migration of the electrolyte occurs laterally as illustrated in PCT/EP2008/064712 in detail. The migration speed and the temperature dependence of the migration speed can be adjusted by the thickness, type and composition of the migration layer during the fabrication. In FIG. 7c the migration of the electrolyte in the migration layer 1300 was proceeding and the subjacent electrode 1200 is electrochemically oxidized where it is in contact with the electrolyte (a part of the electrode 1200 becomes to 1201). Forward moving the migration front 1302 in the migration layer 1300 in this way causes an oxidation front 1202 to proceed in the aluminium film 1200 which is converted into aluminium oxide 1201 up to this oxidation front and becomes transparent this way. Here, the third electrode 1200 can also be used as an optical display element in a time indicator or temperature-time integrator. In an alternative embodiment, the electrodes 300 and 1200 from FIG. 7a are combined into a through electrode 300 (FIG. 8). The function of this arrangement follows in the same way as shown in the example according to FIG. 7a.

Figure 7:
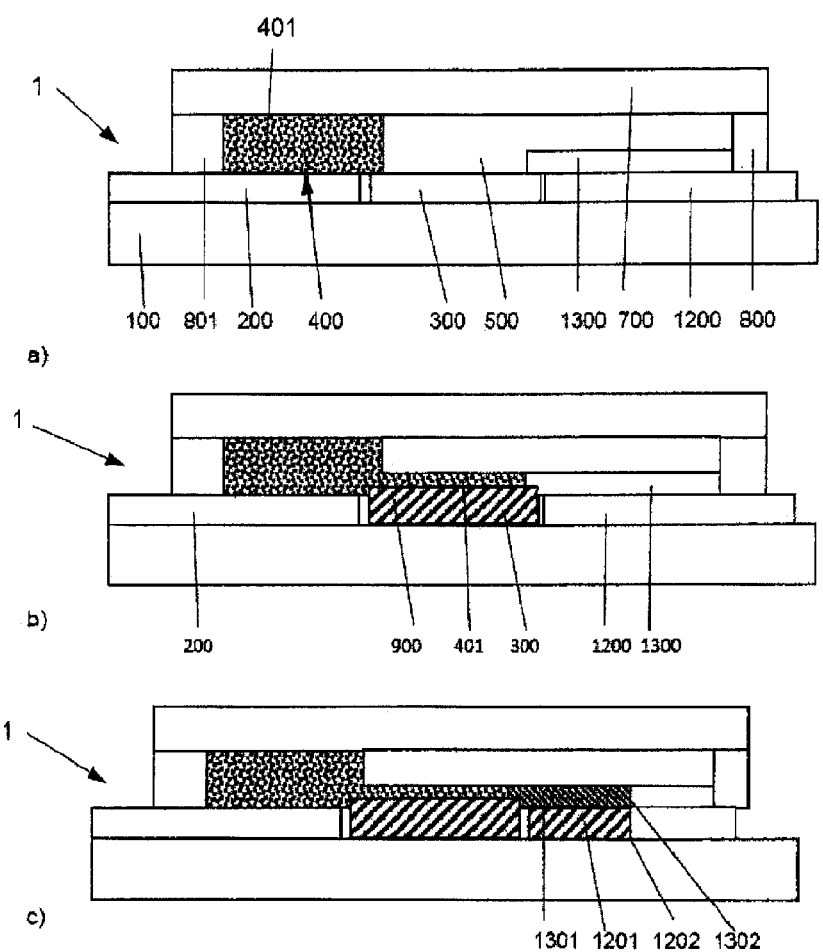
FIG. 7 shows an electrochemical processor according to present invention comprising three electrodes and a migration layer.
Figure 8:
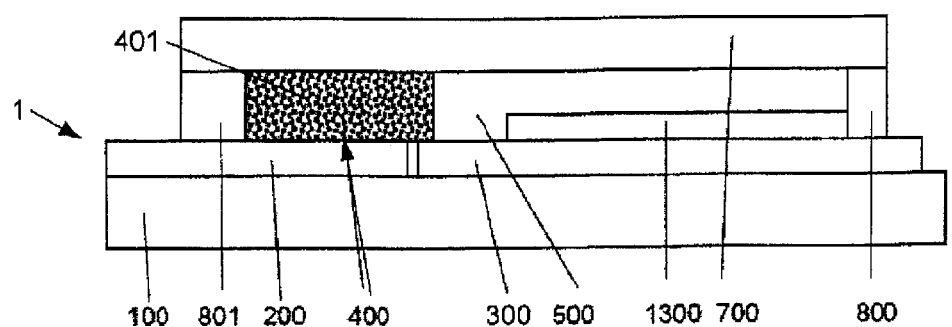
FIG. 8 shows an embodiment of an inventive electrochemical processor with two electrodes and a migration layer.

Alternatively, in the example according to FIGS. 7 and 8, the first electrode 200 can, e.g. also consist of graphite.

Figure 9:
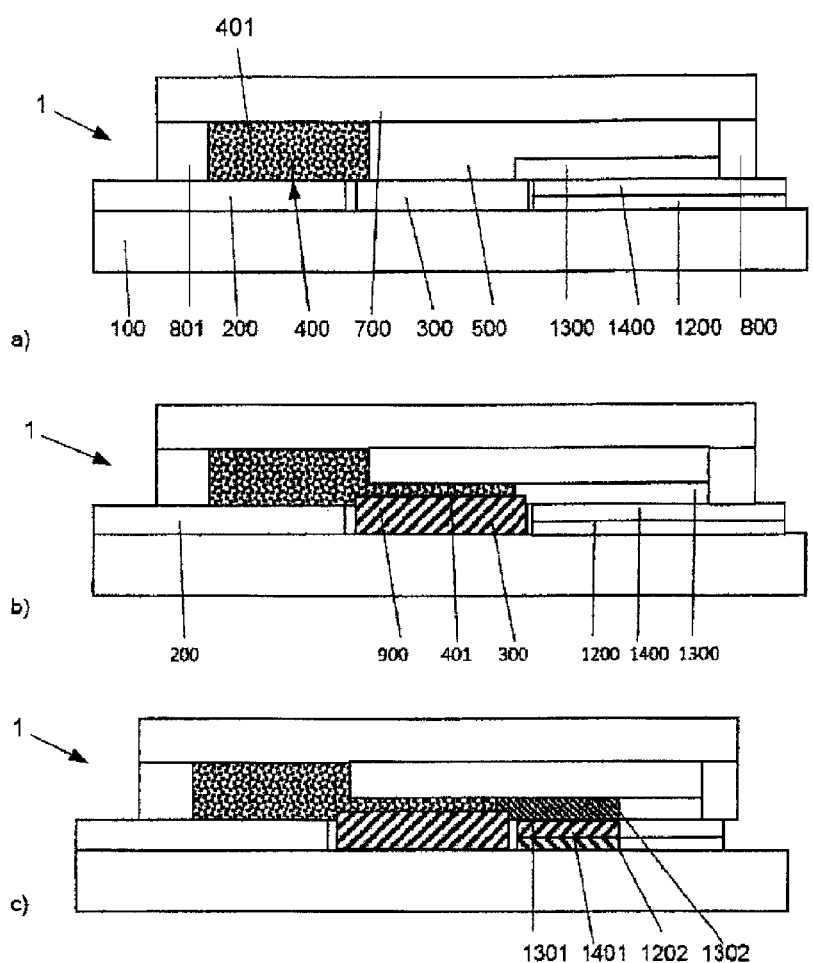
FIG. 9 shows another embodiment of present invention according to which the electrochemical processor comprises three electrodes, wherein the second and the third electrode are bridged by a migration layer and third electrode comprises a covering layer.

FIG. 9 shows an arrangement with a first electrode 200 made of graphite, a second electrode 300 made of aluminium as well as a third electrode 1200 made of aluminium. The aluminium film of the third electrode is combined with an electrode coating film 1400 made of graphite. (The graphite film of the first electrode 200 and electrode coating film 1400 may also have the same film thickness and can thus be generated in the same manufacturing process. In FIG. 9 different film thicknesses are illustrated.

When the electrolyte channel 401 is made as shown in the preceding embodiments then the electrolyte 401 being in contact with the migration layer 1300 (FIG. 9b). This migration layer 1300, e.g. a polyvinyl alcohol layer, is able to absorb the electrolyte on this contact area. The migration of the electrolyte 401 occurs laterally as illustrated in the preceding examples. The electrolyte 401 migrates in the migration layer 1300 up to the migration front 1302. (The migration layer permeated with electrolyte has the reference numeral 1301). Then, the electrolyte is in contact with the subjacent electrode coating film 1400 made of graphite and through this with the aluminium film of the third electrode 1200 as well. Between the aluminium and the graphite, the development of local electrochemical cells takes place. The electrochemical cells are forming, on the one hand, between the aluminium film and graphite particles with the intermediate electrolyte, and on the other hand, the graphite particles are in electrical contact with aluminium. Due to different electrode potentials of aluminium and graphite this results in the electrochemical oxidation of the aluminium film up to the oxidation front 1202 which is determined by the migration front 1302 of the electrolyte. Since aluminium is converted into aluminium oxide then, when the arrangement is viewed from below, reflecting metal layer is no longer visible but a black graphite layer. Here, the third electrode 1200 having the electrode coating layer as optical display element can also be used in a time indicator or temperature-time integrator. In this or in the further embodiments the electrode coating layer 1400 may also consist of other materials. For example, this can be polyaniline.

In an embodiment according to FIG. 10a the arrangement from FIG. 7 is modified in that the migration layer 1300 is shorter, and in that the entire third electrode 1200 and the electrode coating layer 1400 are not covered. When the electrolyte is penetrated into the migration layer 1300 as illustrated above then it is in contact with the left end of the electrode coating layer 1400 as well as with the subjacent third electrode 1200. Also without the migration layer 1300, here the electrolyte is able to migrate in the graphite of the electrode coating layer 1400 as well as the aluminium oxide of the third electrode 1200 developed by means of electrochemical oxidation and between these layers, respectively. Also this effect can be used as optical display element in a time indicator or a temperature-time integrator.

In FIG. 10b, the arrangement from FIG. 10b is modified such that the electrode coating layer 140 is separated into elements 1401 which are embedded in the third electrode 1200, i.e. they do not completely cover the entire third electrode 1200 but are deposited in a structured manner. As a result, island structures or strip structures can be implemented which run in parallel or transversely to the migration direction (in the Figure from left to the right). Also, between the surfaces covered with graphite of the aluminium film of the third electrode 1200 the oxidation of aluminium continues since local electrochemical elements here are also effective in combination with the graphite layer. While the parts of the aluminium film covered with an electrode coating layer 1401 become black when viewed from below, however, the parts of the aluminium film being not covered become transparent. Also, this effect can be used as an optical display element in a time indicator or temperature-time integrator.

In FIG. 10c, there is shown an arrangement in which the second electrode and the third electrode are combined into a single electrode 300. This electrode again consists of aluminium and being covered with an electrode coating layer 1401 on some surface elements. Between the composite coating 500 and electrode 301 having the electrode coating layer 1401 a migration layer 1300 is located. The system is activated in that the electrode 300 is short-circuited with the first electrode 200 on its outer contacts. Because of that the material compound between the composite coating 500 and the aluminium of the electrode 300 is separating as illustrated above. Then, the electrolyte enters into the migration layer 1300 which there is an oxidation of the aluminium film of the electrode 300 with a proceeding oxidation front.

Figure 11:
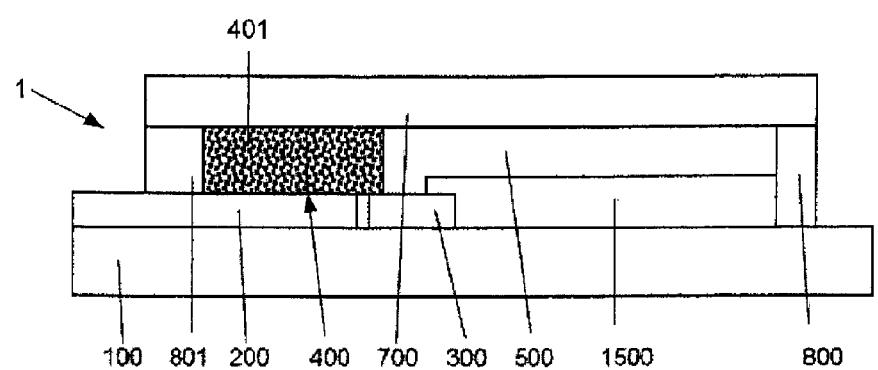
FIG. 11 shows another embodiment according to which the electrochemical processor comprises a migration electrode, which is in direct electrical contact with the second electrode.

In FIG. 11, there is illustrated an arrangement having a first electrode 200 and a second electrode 300. The second electrode 300 is in contact with a migration electrode 1500. Such a migration electrode is formed by the fusion of the functions of an electrically conducting polymer layer (for example polyanilin) and a migration layer (for example polyvinyl alcohol). Then it concerns with, e.g. a "polymer-polymer composite" made of polyanilin and polyvinyl alcohol. When the electrolyte enters from the first reaction chamber 400 into the migration electrode 1500 after the separation of the material compound between the second electrode and the compound layer 500, then the electrolyte migrates in this migration electrode like in a migration layer. When the migration electrode 1500 is electrically connected with the first electrode 200, so in the migration electrode there are electrochemical reaction and an electrochromous effect which depends on the potential difference between the first electrode and the migration electrode.

Figure 10:
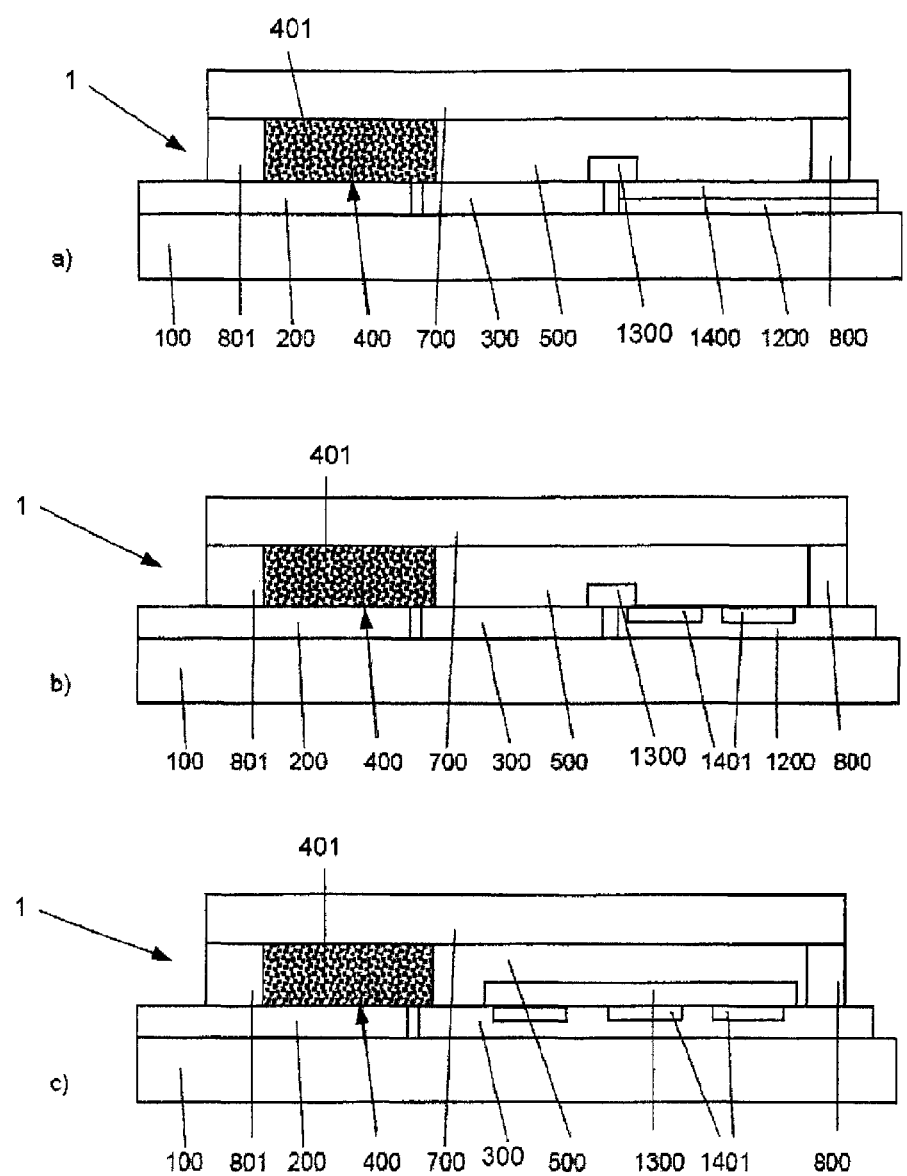
FIG. 10 shows an alternative embodiment according to which the electrochemical processor comprises three electrodes, wherein the second and the third electrode are bridged by a migration layer and the third electrode comprises a covering layer or covering element.
Figure 12:
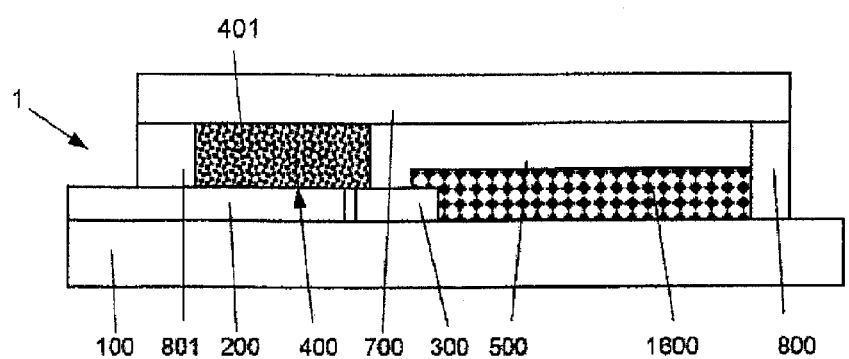
FIG. 12 shows another embodiment according to present invention wherein the electrochemical processor comprises a sub-system, which is in direct electric contact with the second electrode.

FIG. 12 shows an arrangement such as in FIG. 10. However, the migration electrode 1500 herein is substituted by a subsystem 1600. Subsystems are allowed to be all such devices being known from the patent application PCT/EP2008/064712. The whole inventive contents disclosed there is to be included with herein.

Another embodiment results from the cascade connection of single devices of the type described above.

What is claimed is:

1. An electrochemical processor comprising
    a) a first electrode and a second electrode each having first and oppositely arranged second surfaces, wherein the first electrode and the second electrode have different electrode potentials and are physically separated from each other in x-direction,
    b) an electrolyte which covers at least a part of a first surface of the first electrode and a part of the first surface of the second electrode in y-direction and electrically interconnects said first electrode with the second electrode,
    wherein
    at least a part of the first surface of the second electrode which is uncovered by the electrolyte is covered with an electrically insulating material in y-direction which borders the electrolyte, wherein the activation of the electrochemical processor enables a lateral delamination of the second electrode and the insulating material beginning at the contacting area of the second electrode and the insulating material, which provides a channel between the second electrode and the insulating material.

2. The electrochemical processor according to claim 1, wherein a third electrode having a first and an oppositely arranged second surface is aligned next to the second electrode which is physically separated from the second electrode and aligned in x-direction opposite to the first electrode.

3. The electromechanical processor according to claim 1, wherein a substrate is comprised, onto which the first electrode, the second electrode and if present the third electrode are arranged with their respective second surface.

4. The electrochemical processor according to claim 1, wherein an encapsulation layer, which is parallel arranged to the substrate is comprised, wherein the first electrode, the second electrode, if present the third electrode, the electrolyte as well as the insulating material are sandwiched between the substrate and the encapsulation layer in y-direction.

5. The electrochemical processor according to claim 1, wherein two oppositely arranged spacers are comprised, which delimit the electrochemical processor in x-direction, wherein spacer and the isolating material form walls of a first reaction chamber which contains the electrolyte.

6. The electrochemical processor according to claim 1, wherein the spacer
    c) borders the insulating material on the opposite side of the reaction chamber, or
    d) is arranged separately from the insulating material so that the insulating material and the spacer form walls of a second reaction chamber.

7. The electrochemical processor according to claim 6, wherein the second reaction chamber is filled at least partially with a second electrolyte being the same as the first electrolyte or different from the first electrolyte, or a reactant.

8. The electrochemical processor according to claim 1, wherein a swelling layer and/or at least one swelling element is arranged between the second electrode and the insulating material.

9. The electrochemical processor according to claim 1, wherein a migration layer is comprised, which is aligned on a part of the first surface of the second electrode and at least a part of the first surface of the third electrode.

10. The electrochemical processor according to claim 1, wherein the first surface of the second electrode and/or if present the third electrode, respectively
    e) is at least partially covered with a covering layer or
    f) covering elements are embedded in the first surface of said electrodes.

11. The electrochemical processor according to claim 1, wherein
    g) a migration electrode or
    h) a reactive subsystem
    is comprised, which is physically connected with the second electrode.

12. Electrochemical processor according to claim 1, wherein the first electrode, the second electrode and/or the third electrode is designed as layer with a preferred layer thickness between 10 and 100.000 nm, preferably between 20 and 1.000 nm, especially between 30 and 500 nm.

13. Electrochemical processor according to claim 1, wherein the first electrode is electrically connectable to the second electrode, the third electrode, the migration electrode or the subsystem via an external conductive pathway which comprises a switch for completion of the electric circuit.

14. Electrochemical processor according to claim 1, wherein
   a) the first electrode and/or the third electrode comprises a material or is composed of a material selected from the group consisting of graphite carbon black, a two component material comprising graphite and an (meth) acrylic resin; electrically conductive polymers, preferably poly(3,4-ethylenedioxy)thiophene (PEDOT), poly (3,4-ethylenedioxythiophene)-poly(styrenesulfonate) (PEDOT:PSS), polyaniline, doped polyaniline (PANI); and/or metals,
   b) the second electrode comprises a material or is composed of a material selected from the group consisting of metals, such as aluminium, tantalum or electrically conductive polymers, preferably poly(3,4-ethylenedioxy) thiophene (PEDOT), poly(3,4-ethylene-dioxythiophene)-poly(styrenesulfonate) (PEDOT:PSS), polyaniline, doped polyaniline (PANI);
   c) the electrolyte and/or the electrolyte comprises inorganic salts, preferably NaCl, $CaCl_2$, $LiClO_4$, and/or acids, preferably weak acids, wherein the electrolyte is preferably a solution or a gel of said inorganic salts, and/or said acids, wherein the solution or gel can contain additives, such as alkylene glycols, e.g. ethylene glycol, or mixtures of water-ethylene glycol, and/or thickeners, such as polyvinyl alcohols and/or polysaccharides, such as cellulose and/or starch, water-free electrolytes on the basis of N,N-dimethylformamid, N,N-dimethylacetamid and/or γ-butyrolacton,
   d) the electrically insulating material and/or the spacers comprise a material or is composed of a material selected from the group consisting of a polyester, polyethylene, polyropylene and/or a lacquer of a resin, preferably a (meth)acrylic resin, a copolymeric resin comprising a (meth)acrylate and/or a polyurethane,
   e) the substrate comprises a material or is composed of a material selected from the group consisting of a plastic material, preferably polyethylene, polypropylene, coextruded polyethylene, coextruded polypropylene, polyethylene terephthalate, polyethylene naphthalene dicarboxylate, polycarbonate and/or polyamide; paper, coated paper, glass or a ceramic material,
   f) the encapsulation layer comprises a material or is composed of a material selected from the group consisting of a plastic material, preferably a polyethylene, polyester, a laquer on basis of a (meth)acrylate resin, (meth)acrylatecopolymers and/or polyurethanes, wherein said material preferably is transparent,
   g) the swelling layer and/or the at least one swelling element comprises a material or is composed of a material selected from the group consisting of materials that increase its volume upon contact with water or the electrolyte, preferably polyvinyl alcohol,
   h) the migration layer comprises a material or is composed of a material selected from the group consisting of materials that increase its volume upon contact with water or the electrolyte, preferably polyvinyl alcohol,
   i) the covering layer and/or the at least one covering element comprises a material or is composed of a material selected from the group consisting of graphite carbon black, aluminium or electrically conductive polymers, preferably poly(3,4-ethylenedioxy)-thiophene (PEDOT), poly(3,4-ethylenedioxythiophene)-poly(styrenesulfonate) (PEDOT:PSS), polyaniline, doped polyaniline (PANI);
   j) the migration electrode comprises a composite material comprising at least one electrically conductive polymer in combination with a ion conductive polymer, preferably a composite of polyaniline and polyvinyl alcohol, a composite of PEDOT:PSS and polyvinyl alcohol and/or combinations thereof,
   k) the subsystem is composed of substances which show a physical change of at least one material property or undergo a chemical reaction upon contact with an electrolyte and/or an aqueous solution, preferably a colour indicator, a substance or composition producing an exothermic reaction, a substance or composition producing an increase in its volume.

15. Electrochemical processor according to claim 1, wherein a graphics layer comprising at least one image and/or a coloured signal is aligned on at least a part of the second surface of the second electrode.

16. Use of the electrochemical processor according to claim 1 as time indicator, time-temperature-integrator, part of package for food, sauces and/or beverages, drugs, pharmaceuticals, cosmetics and/or chemicals, such as containers, bottles, tetra pack cartons, or lids or screw caps for said containers.

* * * * *